(12) United States Patent
Price

(10) Patent No.: US 12,705,588 B2
(45) Date of Patent: Aug. 11, 2026

(54) INTERACTION CHANNEL BALANCING

(71) Applicant: Visa International Service Association, San Francisco, CA (US)

(72) Inventor: Benjamin Price, Rockingham, VA (US)

(73) Assignee: Visa International Service Association, San Francisco, CA (US)

( * ) Notice: Subject to any disclaimer, the term of this patent is extended or adjusted under 35 U.S.C. 154(b) by 49 days.

(21) Appl. No.: 18/261,630

(22) PCT Filed: Jan. 22, 2021

(86) PCT No.: PCT/US2021/014731
§ 371 (c)(1),
(2) Date: Jul. 14, 2023

(87) PCT Pub. No.: WO2022/159105
PCT Pub. Date: Jul. 28, 2022

(65) Prior Publication Data

US 2024/0078522 A1 Mar. 7, 2024

(51) Int. Cl.
*G06Q 20/06* (2012.01)
*H04L 9/00* (2022.01)

(52) U.S. Cl.
CPC ............. *G06Q 20/065* (2013.01); *H04L 9/50* (2022.05); *G06Q 2220/00* (2013.01); *H04L 2209/56* (2013.01)

(58) Field of Classification Search
None
See application file for complete search history.

(56) References Cited

U.S. PATENT DOCUMENTS 10,394,845 B2 8/2019 Madisetti
2019/0095879 A1* 3/2019 Eyal .................... G06Q 20/223
(Continued)

FOREIGN PATENT DOCUMENTS

CN 110619578 A 12/2019
KR 20200084162 A 7/2020

OTHER PUBLICATIONS

"Lightning Network" Feb. 20, 2019, https://web.archive.org/web/20190220200640/https://lightning.network/ (Year: 2019).*
(Continued)

*Primary Examiner* — David P Sharvin
(74) *Attorney, Agent, or Firm* — Kilpatrick Townsend & Stockton LLP

(57) ABSTRACT

A method includes establishing, with a second computer, a first interaction channel with a first initial value associated with the first computer and a second initial value associated with the second computer, and recording them on a blockchain. The method includes conducting with the second computer, a plurality of interactions without recording the interactions on the blockchain. After that, the method includes determining a first current value associated with the first computer, which is than the first initial value. The method also includes initiating a transfer of transfer value from the first computer to a third computer. The method also includes conducting, with the second computer, an update interaction to update of the first current value by the transfer value to obtain a second current value, the second current value used by the first computer in the first interaction channel.

20 Claims, 6 Drawing Sheets

(56) References Cited

U.S. PATENT DOCUMENTS

| | | | | |
|---|---|---|---|---|
| 2019/0139037 | A1* | 5/2019 | Khalil | H04L 9/3247 |
| 2019/0318326 | A1* | 10/2019 | Russell | G06Q 20/3276 |
| 2019/0332691 | A1* | 10/2019 | Beadles | G06Q 20/3829 |
| 2020/0092106 | A1 | 3/2020 | Leong | |
| 2020/0175502 | A1 | 6/2020 | Ma et al. | |
| 2020/0211003 | A1 | 7/2020 | Fletcher | |
| 2020/0258061 | A1* | 8/2020 | Beadles | H04L 63/102 |
| 2020/0394651 | A1* | 12/2020 | Kreder, III | G06Q 20/22 |

OTHER PUBLICATIONS

PCT/US2021/014731 , "International Search Report and Written Opinion", Oct. 19, 2021, 11 pages.

Goel et al., "Continuous Credit Networks and Layer 2 Blockchains: Monotonicity and Sampling", Jun. 26, 2020, https://arxiv.org/pdf/2004.06167.pdf, 23 pages.

Hosp et al., "Cryptographically-secure Off-chain Multi-asset Instant Transaction network", 2018, https://arxiv.org/ftp/arxiv/papers/1810/1810_02174.pdf, 21 pages.

KR Application No. KR20190000224, Jan. 2, 2019, 29 pages.

* cited by examiner

INTERACTION CHANNEL BALANCING

CROSS-REFERENCE TO RELATED APPLICATIONS

This application is a National Stage of International Application No. PCT/US2021/014731, filed on Jan. 22, 2021, the entirety of which is incorporated by reference herein.

BACKGROUND

The Lightning Network is a "layer 2" payment protocol that operates on top of a blockchain-based cryptocurrency. It enables fast transactions among participating nodes. It has a peer-to-peer system for making micropayments of cryptocurrency through a network of bidirectional payment channels.

The normal use of the Lightning Network includes opening a payment channel by committing a funding transaction to a blockchain (layer 1), followed by making a number of transactions that update the tentative distribution of the channel's funds without broadcasting those to the blockchain. This is followed by closing the channel by broadcasting the final version of the settlement transaction to distribute the channel's funds.

One limitation of layer 2 protocols such as the Lightning Network is that the transactions conducted within the channel are limited by the initial deposits made to a blockchain by the participants to that channel. For example, Alice and Bob can each deposit ten dollars to the channel by recording these deposits to a blockchain. Alice and Bob may perform various transaction between each other without recording any of those transactions to the blockchain.

While this is acceptable in some cases, the amount that one party is able to transfer to the other can be limited. For example, in the above example, after Alice and Bob make their initial deposits, Alice may pay Bob two dollars in five sequential transactions. Alice's balance would be zero dollars, while Bob's would be twenty dollars. At this point, Alice would no longer be able to transfer money to Bob in the channel without contacting the blockchain. To transfer more money to Bob, Alice and Bob would need to close the current channel by recording a closing transaction to the blockchain, and would then need to open a new channel on the blockchain with a new funding transaction.

This can be particular problematic if the parties are conducting many transactions. This can also be problematic if one party to an off-chain channel is paying the other party more frequently that it is receiving payments from the other party. In some cases, each new transaction recorded on the blockchain may take on the order of 10 minutes, and continually opening and closing payment channels would be time consuming and impractical in some settings.

Embodiments of the invention address these and other problems.

SUMMARY

Embodiments of the invention are directed to token provisioning systems and methods.

One embodiment includes a method comprising: establishing, by a first computer with a second computer, a first interaction channel with a first initial value associated with the first computer and a second initial value associated with the second computer, the first and second initial values recorded on a blockchain; conducting by the first computer with the second computer, a plurality of interactions without recording the interactions on the blockchain; after conducting the plurality of transactions, determining, by the first computer, a first current value associated with the first computer, the first current value being less than the first initial value; initiating, by the first computer, a transfer of transfer value from the first computer to a third computer in communication with the second computer via a communication channel different than the first interaction channel; and conducting, by the first computer with the second computer, an update interaction to update of the first current value by the transfer value to obtain a second current value, the second current value used by the first computer in the first interaction channel.

Another embodiment of the invention includes a first computer comprising: a processor; and a non-transitory computer readable medium, comprising instructions, executable by the processor, for causing the first computer to: establish, with a second computer, a first interaction channel with a first initial value associated with the first computer and a second initial value associated with the second computer, the first and second initial values recorded on a blockchain; conduct, with the second computer, a plurality of interactions without recording the interactions on the blockchain; determine a first current value associated with the first computer, the first current value being less than the first initial value; initiate a transfer of transfer value from the first computer to a third computer in communication with the second computer via a communication channel different than the first interaction channel; and conduct, with the second computer, an update interaction to update of the first current value by the transfer value to obtain a second current value, the second current value used in the first interaction channel Another embodiment of the invention includes establishing, by a second computer with a first computer, a first interaction channel with a first initial value associated with the first computer and a second initial value associated with the second computer, the first and second initial values recorded on a blockchain; conducting, by the second computer with the first computer, a plurality of interactions without recording the interactions on the blockchain, wherein after conducting the plurality of transactions, the first computer determines a first current value associated with the first computer, the first current value being less than the first initial value, and initiating, by the first computer, a transfer of transfer value from the first computer to a third computer in communication with the second computer via a communication channel different than the first interaction channel; receiving, by the second computer, a message from the third computer that the transfer of value occurred; and conducting, the second computer, an update interaction to update of the first current value by the transfer value to obtain a second current value, the second current value used by the first computer in the first interaction channel Other embodiments of the invention can be directed to a second token requestor programmed to perform the above method.

These and other embodiments of the invention are described in further detail below.

DETAILED DESCRIPTION

Figure 1:
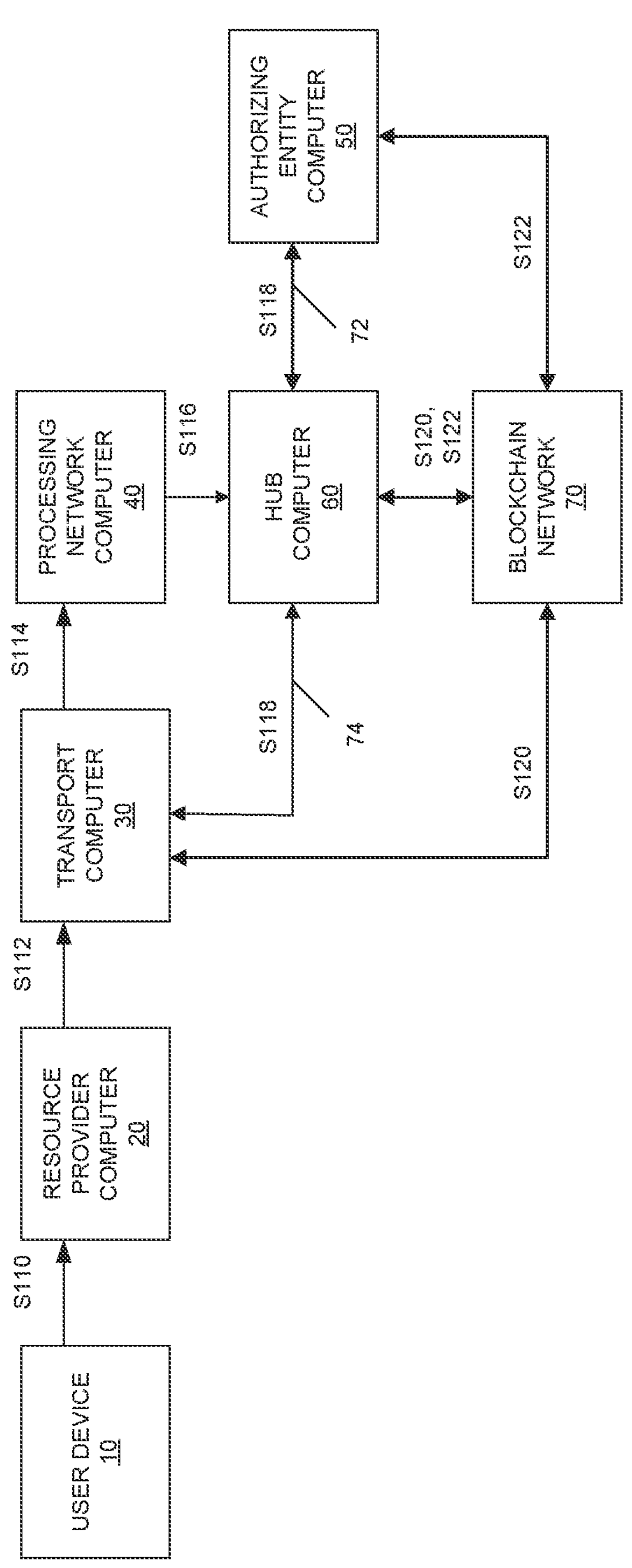
FIG. 1 shows a system diagram and a process flow for processing a fiat current transaction.

Before discussing embodiments of the invention, some description of some terms may be helpful.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component. The user device may also be a payment device in some instances.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "resource provider" may be an entity that can provide a resource such as goods, services, information, and/or access. Examples of resource providers includes merchants, data providers, transit agencies, governmental entities, venue and dwelling operators, etc. A resource provider may operate a resource provider computer, which may be include an access device.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer". In some embodiments, an acquirer can be considered a cryptocurrency custodian, if it holds cryptocurrencies.

An "authorizing entity" may be an entity that authorizes a request. Examples of an authorizing entity may be an issuer, a governmental agency, a document repository, an access administrator, etc. An authorizing entity may operate an authorizing entity computer such as an issuer computer. In some embodiments, the authorizing entity computer may manage fiat currency accounts and cryptocurrency accounts for its users.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "m POS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processing network computer" may include a system that can support and deliver data services. A processing network computer can be in a "payment processing network" that may include data processing subsystems, networks, server computers and operations used to support and deliver authorization services, exception file services, and clearing and settlement services. A payment processing network may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

A "cryptocurrency issuer" may include an entity that manages a cryptocurrency account on behalf of a user. A cryptocurrency issuer may also broker exchanges between different cryptocurrencies or cryptocurrencies and fiat currencies. A cryptocurrency issuer may issue or provide a digital wallet application to a user. This digital wallet application may be used by the user in order to perform cryptocurrency transactions. When a user performs a cryptocurrency transaction, the cryptocurrency issuer may approve or deny that transaction, in order to prevent fraudulent spending of the user's cryptocurrency funds.

A "cryptocurrency custodian" may include an entity that provides storage and security services for cryptocurrencies. These may include, for example, storing cryptocurrencies for other financial organizations, such as banks (including acquiring entities) and hedge funds. A cryptocurrency custodian may maintain a cryptocurrency account on behalf of an acquirer. In some cases, a cryptocurrency issuer and cryptocurrency custodian may comprise a single entity. In some embodiments, a cryptocurrency custodian can also be a cryptocurrency exchange, where cryptocurrencies can be bought or sold with fiat currency.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC).

A "digital signature" may include any electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "cryptogram" may include any packet of encrypted data. A cryptogram may be used to securely transmit sensitive data (such as transaction data or interaction data) through a public network such as the Internet.

A "hash" or "hash value" may include any data element produced using a "hashing function." A hashing function may be used to transform data of arbitrary size to data of fixed size (for example, 1 KB). A hash function may be used to generate commitments to secret data, such as a secret token, without revealing the secret data itself. Some hash functions are "collision resistant," meaning it is difficult to determine two inputs that produce the same hash output. Collision resistant hash functions can be used as a security feature in blockchains.

A "blockchain" may include a database that maintains a continuously-growing list of records secured from tampering and revision. A blockchain may include a number of blocks of event records recorded by one or more peers. Each block in the blockchain can contain also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network.

A "node" of a blockchain may include a computer or software node. In some cases, each node in a blockchain network has a copy of a digital ledger or blockchain. Each node checks the validity of each transaction. In some cases, if a majority of nodes conclude that a transaction is valid, then it is written into a block.

An "off-chain channel" or "off-chain interaction channel" may include a channel used to perform cryptocurrency transactions or micro-transactions without broadcasting to the underlying blockchain. An off-chain channel may be referred to as a "layer two channel." Channels in the Lightning Network are examples of off-chain channels. In some implementations, an off-chain channel may be opened by broadcasting a "funding transaction" or "opening transaction" to the blockchain. The participants on the off-chain channel can then perform cryptocurrency transactions with one another without broadcasting to the blockchain. The off-chain channel can be closed by broadcasting a "commitment transaction" or "closing transaction," at which point the funds on the off-chain channel are distributed to the participants.

An "electronic wallet" or "digital wallet" may include an electronic device or service that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card. Digital wallets may also be used manage cryptocurrencies and execute cryptocurrency transactions, including, for example, receiving cryptocurrencies at a cryptocurrency address associated with the digital wallet holder or transmitting cryptocurrencies to other cryptocurrency addresses. A digital wallet may have a corresponding "digital wallet token" that can be used in place of another digital wallet credential in order to perform transactions or receive authorization for transactions.

A "cryptocurrency transaction" may include a payment transaction that utilizes cryptocurrency instead of fiat currency. Cryptocurrency transactions may include (but are not limited to) transactions using Bitcoin, Etherium, and USDC. Cryptocurrency transactions may further be processed by a blockchain network. Responsive to processing, cryptocurrency transactions may be added to a ledger of transactions included within the blockchain network.

A "cryptocurrency transaction identifier" may include any suitable data element that identifies a cryptocurrency transaction. For example, a cryptocurrency transaction identifier may be a string of alphanumeric characters. In some embodiments, a cryptocurrency transaction identifier may be a hashed value.

A "cryptocurrency address" may include an identifier that indicates a destination and/or a source for a cryptocurrency payment. For example, a cryptocurrency address may be a string of at least 26 to 35 alphanumeric characters. As another example, a cryptocurrency address may be a public key. Each cryptocurrency transaction may include a cryptocurrency address of a sender (e.g., a source of a cryptocurrency payment) and a cryptocurrency address of a recipient (e.g., a destination of a cryptocurrency payment).

Embodiments of the invention can allow for the rebalancing of an off-chain channel that is formed between a first computer (e.g., an authorizing entity computer such as a cryptoissuer computer) and a second computer (e.g., a hub computer). The off-chain channel need not be closed in the event that either the first computer or the second computer has already used up their funds in that off-chain channel. In some embodiments, a third computer such as a processing network computer can facilitate the re-balancing of the digital currency transacted in the off-chain channel by using one or more fiat currency (or other currency type) transfers. The processing network computer can also perform authorization processing or message switching in a fiat currency payment system that does not utilize cryptocurrencies to conduct transactions.

FIG. 1 shows a system diagram and a process flow for processing a cryptocurrency transaction that can be used in an embodiment of the invention. The system in FIG. 1 can be used to allow a user using a user device to perform an interaction (e.g., conduct a transaction) at a resource provider operating a resource provider computer.

The system illustrated in FIG. 1 comprises a user device 10 that can interact with a resource provider computer 20. The resource provider computer 20 can communicate with a transport computer 30. The transport computer 30 can be in communication with a processing network computer 40, a hub computer 60, and the blockchain network 70. An authorizing entity computer 50 can be in communication with the hub computer 60 and the blockchain network 70.

The system in FIG. 1 can also include a first off-channel 72 formed between the authorizing entity computer 50 and the hub computer 60. The system in FIG. 1 can also include a second off-chain channel 74 formed between the hub computer 60 and the transport computer 30. Interactions occurring in the first off-chain channel 72 and the second off-chain channel 74 are not recorded on the blockchain in the blockchain network 70.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

Although FIG. 1 shows a particular number of computers and channels for purposes of illustration, it is understood that embodiments of the invention are not limited thereto. For example, in some embodiments, there can be many transport computers and many authorizing entity computers interacting with the hub computer. Further, in some embodiments, the hub computer 60 may be part of the processing network computer 40.

The user device 10 may comprise any suitable portable device, such as a smartphone, tablet, card, or laptop computer. The user device 10 may possess a number of communications interfaces, including for example, a cellular communication interface, a Wi-Fi communication interface, Bluetooth communication interface, near-field communication interface, and the like. The user device 10 may use any of these communication interfaces to communicate with other devices in the network, including the hub computer 60, the authorizing entity computer 50, the processing network computer 40, and the resource provider computer 20. The user device 10 may also comprise an optical interface (such as a camera) that can be used to collect data such as QR codes.

The user device 10 may possess an access token (such as a digital wallet token) issued by the processing network computer 40, the hub computer 60, or the authorizing entity computer 50. This digital wallet token may be used in place of a traditional payment credential (such as a payment account number, PAN) when conducting a transaction with the resource provider operating resource provider computer 20. The digital wallet token may indicate to the processing network computer 40 or any other suitable computer in the system that the transaction is to be conducted using cryptocurrency instead of fiat currency.

Additionally, the user device 10 may possess a cryptographic key, such as a limited use key (LUK), which may also be issued to user device 10 by processing network computer 40, hub computer 60, or authorizing entity computer 50. The LUK may have a limited lifetime (e.g., for one week or for up to five transactions), such that any data encrypted using the LUK beyond its lifetime may not be validated for a transaction.

During a transaction, the user device 10 may receive interaction data from the resource provider computer 20, including an interaction value (e.g., transaction amount, price, etc.), a resource provider identifier, a hash of a secret value (or "secret token"), and any other relevant information (such as a timestamp associated with the transaction, and/or a geographic location, such as a zip code, city name, country name, etc.)

The user device 10 may use the LUK to generate a cryptogram. The LUK may be used to encrypt the digital wallet token and any interaction data from the user device 10. The user device 10 can transmit this cryptogram to the resource provider computer 20. The resource provider computer can then forward the cryptogram to the processing network computer 40 via the transport computer 30. In some embodiments, the cryptogram may be present in an authorization request message (e.g., a standard ISO 8583 formatted message). In addition to the cryptogram, the authorization request message may comprise the interaction amount, the resource provider identifier, an access device identifier, and routing data sufficient to route the authorization request message to the hub computer 60. In some embodiments, the routing data may also include the digital wallet token. In other embodiments, the digital wallet token may only be present in the cryptogram, and the routing data might include a conventional payment token or primary account number. The latter data would be sufficient to route the authorization request message to the processing network computer 40.

In some embodiments, the resource provider computer 20 may comprise an access device such as a point-of-sale terminal. One function of the resource provider computer 20 may be to collect interaction information (e.g., payment information, such as a credit card number, payment token, or digital wallet token) and forward it to processing network computer 40 in order to later receive authorization to complete the interaction. The resource provider computer 20 may comprise any number of devices, interfaces, or peripherals in order to perform this function. For example, the resource provider computer 20 may comprise a screen that can display interaction information, enabling a user of user device 10 to review the interaction information before providing any payment details. Additionally, the resource provider computer 20 may use this screen to display QR codes. These QR codes may encode the interaction data described above. The resource provider computer 20 may transmit this interaction data by displaying the QR code on the screen, allowing the user device 10 to collect the QR code using an optical reader or camera. Additionally, the resource provider computer 20 may comprise one or more communication interfaces (e.g., cellular, Bluetooth, Wi-Fi, Ethernet, NFC, Ethernet, etc.) that it may use to communicate with other devices in the network. These communications may include, for example, transmitting interaction data to user device 10, receiving a cryptogram from user device 10, transmitting the cryptogram to transport computer 30, and receiving an authorization response message (indicating whether the interaction was authorized) from transport computer 30.

Transport computer 30 may comprise a computer system associated with an acquiring entity. In some embodiments, the acquiring entity comprises an acquiring bank that manages an account on behalf of the resource provider (e.g., a merchant). The transport computer 30 can receive the cryptogram from resource provider computer 20 and forward it to processing network computer 40. Later, the transport computer 30 can receive an authorization response message (indicating whether the interaction was authorized) and forward the authorization response message to resource provider computer 20. In some embodiments, transport computer 30 may be associated with transport computer 30. That is, transport computer 30 may provide cryptocurrency custodial services (such as storage, for example) for transport computer 30, or transport computer 30 and transport computer 30 may comprise a single computer system.

Processing network computer 40 may comprise a server computer. The processing network computer 40 may route interaction (payment) information between acquirers and issuers (typically issuing banks associated with users), in order to enact payment between the user and the resource provider. The processing network computer 40 may also route authorization request and response messages between these entities, in order to indicate to the resource provider and user whether a transaction has been approved or denied. The processing network computer 40 can perform these functions for both conventional interactions (e.g., those involving payment credentials such as PANs), tokenized interactions, and token based cryptocurrency interactions as disclosed herein. The processing network computer 40 may comprise a token provider computer, and may have provisioned the digital wallet token to the user device 10.

The processing network computer 40 may be in a payment processing network, which may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

Processing network computer 40 may decrypt the cryptogram received from the user device 10 in order to determine the digital wallet token, the resource provider identifier, and the interaction value (if these values were not otherwise received in an authorization request message). The processing network computer 40 may decrypt the cryptogram using a cryptographic key corresponding to the LUK issued to the user device 10. If the processing network computer 40 is able to decrypt the cryptogram with the LUK and confirms that the LUK that was used to decrypt the cryptogram is valid and has not expired, then the processing network computer 40 may initially determine that the cryptogram is valid.

The processing network computer 40 may determine, based on the digital wallet token (which is an example of an access token), that the interaction taking place between the user device 10 and resource provider computer 20 (or user and resource provider) is a cryptocurrency-based interaction, rather than a conventional interaction (e.g., a conventional credit or debit card transaction). In some embodiments, using a database or other suitable data structure, the processing network computer 40 may identify another access token such as a "virtual payment account number" or "VPAN" associated with the digital wallet token. The processing network computer 40 can forward at least the VPAN, the interaction value, and the resource provider identifier to hub computer 60. In other embodiments, the processing network computer 40 can send the access token to the hub computer 60 without obtaining a VPAN.

Hub computer 60 may comprise a server computer that acts as a hub between blockchains, processing network computers, cryptocurrency issuer computers (e.g., authorizing entity computer 50) and cryptocurrency custodians (e.g., transport computer 30). The hub computer 60 maintains off-chain channels between itself, authorizing entity computers (e.g., cryptocurrency issuers) and transport computers (i.e., off-chain channels 72 and 74). Hub computer 60 may also interface with a blockchain 60. Blockchain 60 can be used to implement the first off-chain channel 72 and the second off-chain channel 74.

The hub computer 60, its components, and its functions are described in more detail with reference to FIG. 6 below. However, before describing the hub computer 60, it may be helpful to describe off-chain channels in more detail.

Off-chain channels, sometimes referred to as "layer two" channels, are used to perform secure cryptocurrency transactions without broadcasting each transaction to the blockchain. This contrasts with traditional cryptocurrency transactions, where each transaction is broadcast and written to the blockchain. By reducing the number of transactions broadcast to the blockchain, off-chain channels increase the total transaction processing rate of the underlying blockchain.

There are many ways in which off-chain channels can be implemented. In some implementations, off-chain channels are created using a "funding transaction" that is broadcast to the underlying blockchain. In the funding transaction, the two participants in the off-chain channel (such as the hub computer 60 and authorizing entity computer 50) each contribute some cryptocurrency to the channel. This cryptocurrency cannot be spent or transferred by either participant until the off-chain channel is closed. This closure occurs when a "closing transaction" or "commitment transaction" is written to the blockchain by either one of the participants. This commitment transaction is usually cryptographically signed by both participants, in order to indicate that the participants agree on the channel closure.

The participants are then free to "transact" any number of times by rebalancing the available funds on the channel. For example, the authorizing entity computer 50 and the hub computer 60 could each contribute 0.5 BTC (Bitcoins) to the first off-chain channel 72 in a funding transaction, for a total of 1 BTC on the off-chain channel. The current balance of the channel would reflect that each participant possesses 0.5 BTC on the channel. The authorizing entity computer 50 could then pay the hub computer 60 0.1 BTC. After this payment, the channel's state would reflect that the authorizing entity computer 50 possesses 0.4 BTC and the hub computer 60 possesses 0.6 BTC. If the hub computer 60 and the authorizing entity computer 50 have completed their transactions, either participant can close the channel by writing a commitment transaction to the blockchain 60. Off-chain channel 74 will then free the cryptocurrency on the channel, allowing the authorizing entity computer 50 to spend or transfer 0.4 BTC, and the hub computer 60 to spend or transfer 0.6 BTC.

In some implementations, participants on the off-chain channel will generate commitment transactions each time the off-chain channel is rebalanced. The participants will each sign their generated commitment transaction, and then transmit it to the other participant. If a participant wants to close the channel, they can sign the received commitment transaction with their own private key. At this point, the commitment transaction has been signed by both participants and can be broadcast to the blockchain to close out the channel. If neither participant is interested in closing the off-chain channel, they can digitally store the commitment transactions until the off-chain channel is rebalanced and new commitment transactions are generated. At this point, the old commitment transactions can be deleted.

Typically, off-chain channels use some form of transaction scripting (such as Bitcoin Transaction Scripting) in order to enforce rules and penalties, rather than relying on participants to behave honestly. An exemplary transaction script is a "time lock" that prevents cryptocurrency from being spent or transferred until a certain amount of time has expired. Alternative time locking scripts can prevent cryptocurrency from being spent until a certain number of additional blocks have been written to the blockchain.

As such, off-chain channels 62 and 64 can be used to implement cryptocurrency payments between the authorizing entity computer 50 and hub computer 60, and between the hub computer 60 and transport computer 30. As such, hub computer 60 can effectively manage cryptocurrency payments between authorizing entity computer 50 (and by extension, the user of user device 10) and transport computer 30 (and by extension, the resource provider operating resource provider computer 20).

A method of conducted cryptocurrency transaction will now be described with reference to FIG. 1.

At step S110, during an interaction between a user of user device 10 and a resource provider operating resource provider computer 20, user device 10 can generate an interaction cryptogram and transmit the interaction cryptogram to resource provider computer 20. The interaction cryptogram can comprise one or more of interaction data, digital representations of data corresponding to the interaction, as well as the digital wallet token, encrypted using a limited use key. The interaction data can comprise, for example, an interaction value (such as the price or cost of the good or service, represented in cryptocurrency), as well as a resource provider identifier (used to identify the resource provider operating the access device). The interaction data can additionally comprise other relevant interaction information, such as a timestamp corresponding to the interaction, a merchant category code, etc. Resource provider computer 20 may transmit the interaction data to the user device 10 enabling user device 10 to generate the interaction cryptogram. In some embodiments, the digital wallet application operating on user device 10 can request the interaction data in the processing data object list (PDOL) of the file control information (FCI) sent to the user device 10 during the interaction. Alternatively, resource provider computer 20 may generate and display a QR code that the user device 10 can scan in order to gain access to the interaction data. In some cases, the user device 10 and/or the access device may include information (e.g., network addresses, pseudo account numbers, etc.) in any message that is eventually transmitted to the transport computer 30 and/or the processing network 112 that would be sufficient to route the message.

At step S112, the resource provider computer 20 can forward the interaction cryptogram to the transport computer 30. Subsequently at step S114, the transport computer 30 can forward the interaction cryptogram to the processing network computer 40.

The processing network computer 40 can decrypt the interaction cryptogram and identify an access token corresponding to the digital wallet token. The processing network computer 40 can use a cryptographic key corresponding to the limited use key to decrypt the cryptogram to retrieve the access token and the interaction value (along with any other interaction data, such as a resource provider identifier). In other embodiments, the digital wallet token, interaction amount, and the resource provider identifier are in the authorization request message, along with the cryptogram. In such embodiments, the decryption of the cryptogram by the processing network computer 40 using a valid limited use key, and the comparison of the decrypted data to the data in the authorization request message may serve to validate the authorization request message.

Further, the processing network computer 40 can use a token database to determine an access token corresponding to the digital wallet token.

At step S116, the processing network computer 40 can transmit the access token, interaction value, and any other interaction data, such as the resource provider identifier to the hub computer 60.

The hub computer 60 can identify the authorizing entity computer 50, the transport computer 30, and their associated off-chain channels, e.g., the first off-chain channel 72 and the second off-chain channel 74. The hub computer 60 can use the access token, the resource provider identifier, and an off-chain channel database, to identify these entities and channels. In some embodiments, the hub computer 60 can determine a cryptocurrency issuer computer address using the access token, the cryptocurrency issuer address associated with the authorizing entity computer 50, and determine a transport computer based on the resource provider identifier.

The first off-chain interaction channel 72 may have been previously opened by the hub computer 60 and authorizing entity computer 50. The first off-chain interaction channel 72 may have been formed by at least a first initial recordation between the hub computer 60 and authorizing entity computer 50 on blockchain network 70 (e.g., a funding transaction). Further, the first off-chain interaction channel 72 may later be closed by a first closing recordation between the hub computer 60 and the authorizing entity computer 50 on the blockchain network 70 (e.g., a commitment transaction).

Likewise, the second off-chain interaction channel 74 may have been previously opened by the hub computer 60 and the transport computer 30. The second off-chain interaction channel 74 may have been formed at least by a second initial recordation between the hub computer 60 and transport computer 30 on blockchain network 70 (e.g., a funding transaction). Further, the second off-chain interaction channel 74 may later be closed by a second closing recordation between the hub computer 60 and the transport computer 30 on the blockchain network 70 (e.g., a commitment transaction).

At step S118, having identified the authorizing entity computer 50 based on the access token, the hub computer 60 can transmit a first off-chain interaction request comprising the interaction value to the authorizing entity computer 50. In some embodiments, the first off-chain interaction request additionally comprises the access token and any associated interaction data.

The authorizing entity computer 50 can use the access token, interaction value, and other interaction data in order to determine whether to approve or deny the interaction. The authorizing entity computer 50 can, for example, check a user account associated with the access token to determine if the user possesses enough cryptocurrency to complete the interaction. Additionally, the authorizing entity computer 50 can perform fraud detection using the interaction information in order to determine if the interaction is legitimate. For example, the authorizing entity computer 50 can analyze a time stamp, or a geographic location associated with the interaction to determine if it is an unusual place or time for the user to attempt to perform an interaction. Additionally, the authorizing entity computer 50 can update the user's account balance, by identifying a user account corresponding to the access token and the mobile device and subtracting the interaction value from an account value associated with the user account.

Provided the authorizing entity computer 50 approves the interaction, the authorizing entity computer 50 and hub computer 60 can update the state of the first off-chain channel 72 in order to enact payment from the user's cryptocurrency account. Updating the state of the channel depends on the particular off-chain channel implementation. In some embodiments, the authorizing entity computer 50 can sign interaction data including the interaction value to form an authorizing entity computer cryptographic signature. This authorizing entity computer cryptographic signature can be used to create a first off-chain interaction response and sent to the hub computer 60. In some embodiments, the first off-chain interaction response may comprise a commitment transaction. If the hub computer 60 later wishes to close the channel, it can sign the first off-chain interaction response with its own private key and broadcast it to blockchain network 70. In other embodiments, the first off-chain interaction response may comprise a signed cryptographic promise to deliver cryptocurrency in the amount of the interaction value. The hub computer 60 may later deliver this signed cryptographic promise to transport computer 30 via the second off-chain channel 74 in order to enact payment between the authorizing entity computer 50 and transport computer 30.

After receiving the first off-chain interaction response message from the authorizing entity computer 50, and updating the first off-chain interaction channel 72, the hub computer 60 and transport computer 30 can update the state of the second off-chain interaction channel 74. How the hub computer 60 and transport computer 30 update the second off-chain interaction channel 74 depends on the particular implementation of the second off-chain interaction channel. In some embodiments, the hub computer 60 can transmit a second off-chain interaction request comprising the interaction value, the resource provider identifier, and optionally a second hub computer cryptographic signature to the transport computer 30. The second off-chain interaction request may essentially amount to a signed cryptographic promise, indicating that the hub computer 60 will transfer an amount of cryptocurrency equal to the interaction value to the transport computer 30. The second off-chain interaction request may also comprise a commitment transaction, signed by the hub computer 60. If the transport computer 30 wants to close the channel and collect the cryptocurrency, it can sign the second off-chain interaction request and broadcast it to blockchain network 70.

After receiving the second off-chain interaction request, the transport computer 30 may generate and sign a second off-chain interaction response, comprising a cryptocurrency custodian computer cryptographic signature, and transmit it to the hub computer 60. The second off-chain interaction response may indicate that the cryptocurrency custodian computer accepts the off-chain cryptocurrency transfer. The second off-chain interaction response may comprise a commitment transaction, signed by the cryptocurrency custodian computer.

The authorizing entity computer 50 can transmit a confirmation message to the application on the user device 10 for the interaction. This confirmation message can comprise authorization confirmation, indicating to the user of the user device 10 that the interaction between the user and the resource provider has been approved, and that the user's account has been debited in the amount of the interaction value.

The hub computer 60 can transmit an authorization response message for the interaction to the resource provider computer 20, via (optionally) the processing network computer 40, and the transport computer 30. In some embodiments, the hub computer 60 instead transmits the authorization response message to the processing network computer 40, which thereafter generates an authorization cryptogram comprising the authorization response message and transmits the authorization cryptogram to the resource provider computer 20.

The hub computer 60 (or the authorizing entity computer 50) can optionally close the first off-chain channel 72 by broadcasting the closing recordation to a computer network (i.e., a blockchain network) corresponding to blockchain network 70. The hub computer 60 can do this if the interactions between itself and the authorizing entity computer 50 are complete, or if the channel funds have become totally deplete, or for other reasons (e.g., suspected fraud, renegotiating relationship between the two entities, etc.).

Once a participant (e.g., the hub computer 60) broadcasts the closing recordation (e.g., a commitment transaction signed by both the hub computer 60 and the other party on the off-chain channel), the closing recordation can be included in a block appended to the blockchain (e.g., a "mined" block). In order to include the closing recordation, a "miner" needs to first confirm the closing recordation, then generate a proof-of-work. Confirming the closing recordation typically involves verifying that the cryptocurrency corresponding to the closing recordation has not been double spent. In some embodiments, the closing recordation may include a mining fee to incentivize miners to include the closing recordation in the next block they mine. Once a miner has confirmed the closing recordation and agreed to include the closing recordation in the next block, the miner can begin the time-consuming process of generating the proof-of-work.

In some blockchains, the proof-of-work function involves determining a hash value that is lower than a target hash value. Because hash values are often unpredictable and appear random, generating the proof-of-work is typically a time-consuming, trial-and-error based process, which can involve guessing a nonce that will produce the desired hash value, when included with the data (e.g., transactions) to be written to that block. Blockchains such as the Bitcoin blockchain have a "difficultly" value that relates to the probability that a correct proof-of-work is generated. This difficulty value is often high in order to reduce the rate at which blocks are added to the blockchain (for Bitcoin, roughly once every 10 minutes). Once a miner has discovered the proof-of-work, the block including the closing recordation can be broadcast through the blockchain network and added to the blockchain. Subsequently, the participants on the off-chain channel can spend the cryptocurrency previously on the channel (subject to the terms of any smart-contracts or other limitations, as described above).

Figure 2:
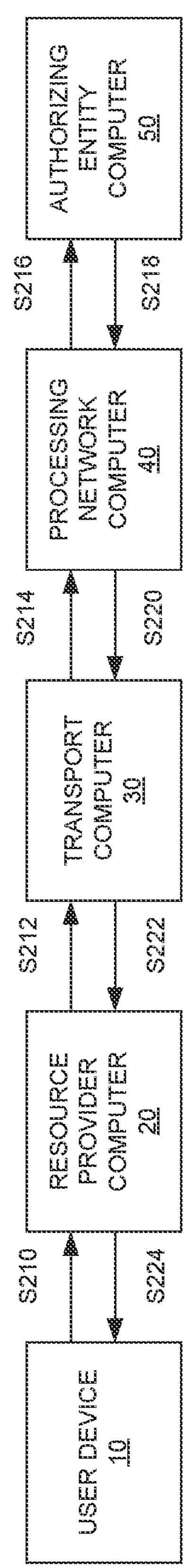
FIG. 2 shows a system diagram and a process flow for processing a cryptocurrency transaction according to an embodiment of the invention.

FIG. 2 shows a system diagram and a process flow for processing a fiat current transaction. The fiat currency transaction can be a credit, debit, or prepaid card transaction.

FIG. 2 shows a block diagram of a transaction processing system that can use a user device 10 with access data (e.g., a token). In FIG. 2, a user can operate a user device 10. The user may use the user device 10 to pay for a good or service at a resource provider such as a merchant. The merchant may operate a resource provider computer 20. The merchant may communicate with the authorizing entity computer 50 operated by an issuer, via a transport computer 30 operated by an acquirer and a processing network computer 40 that may be present in a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 10 at a resource provider computer 20 (e.g., POS location) can be described as follows. In step S210, a user 906 presents his or her user device 10 to the resource provider computer 20 to pay for an item or service. The user device 10 and the resource provider computer 20 interact such that access data from the user device 10 (e.g., PAN, a payment token, verification value(s), expiration date, etc.) is received by the resource provider computer 20 (e.g., via contact or contactless interface). In step S212, the resource provider computer 20 may then generate an authorization request message that includes the information received from the resource provider computer 20 (i.e. information corresponding to the user device 10) along with additional transaction information (e.g., a transaction amount, merchant specific information, etc.) and electronically transmits this information to a transport computer 30. In step S214, the transport computer 30 may then receive, process, and forward the authorization request message to a processing network computer 40 for authorization. In step S216, the processing network computer 40 may then receive the authorization request message, determine the issuer associated with the user device 10, and forward the authorization request message for the transaction to the authorizing entity computer 50 for authorization.

In step S218, once the transaction is authorized, the authorizing entity computer 50 may generate an authorization response message and transmit it to the processing network computer 40. In steps S220 and S222, the processing network computer 40 may then forward the authorization response message to the transport computer 30, which may then transmit it to the resource provider computer 20. In step S224, the user of the user device 10 may receive an indication transaction completion.

If the access data is in the form of a token, then the processing network computer 40 may exchange the token for a real credential (e.g., a PAN). Any authorization request message may then be modified to include the real credential and it may be forward to the authorizing entity computer 50 for verification. The authorizing entity computer 50 can generate an authorization response message with an approval or decline. The authorization response message can be transmitted to the processing network computer 40, and the processing network computer 40 may replace the credential with the token. The processing network computer 40 may then transmit the authorization response message back to the resource provider computer 20.

At the end of the day or at some other suitable time interval, a clearing and settlement process between the resource provider computer 20, the transport computer 30, the processing network computer 40, and the authorizing entity computer 50 may be performed on the transaction.

Figure 3:
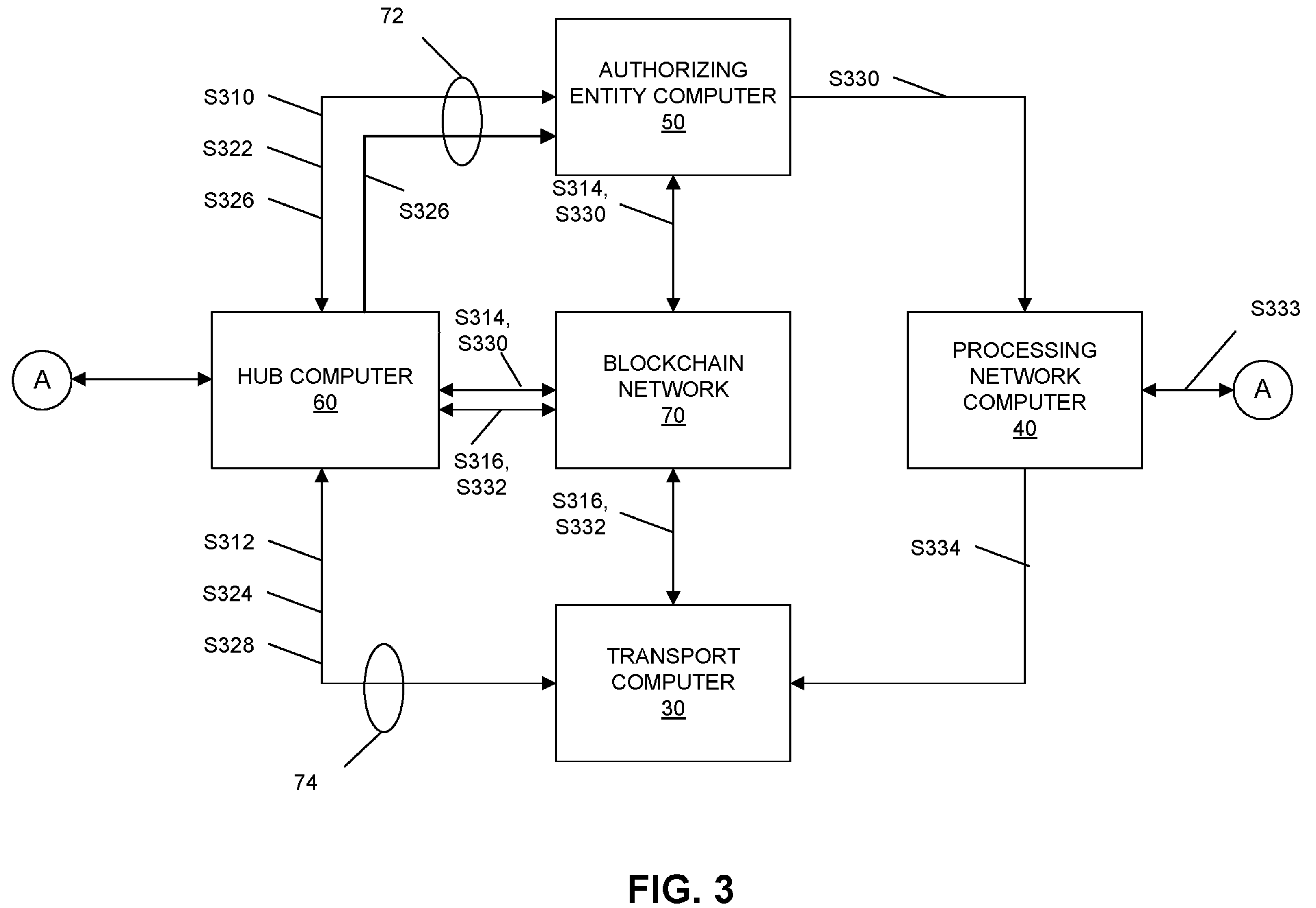
FIG. 3 shows a system diagram and a process flow for rebalancing an interaction channel according to an embodiment of the invention.

FIG. 3 shows a system diagram and a process flow for rebalancing an interaction channel such as an off-chain interaction channel according to an embodiment of the invention. The entities in FIG. 3 are described above with respect to FIG. 1, and the descriptions thereof need not be repeated here. In the example in FIG. 3, the authorizing entity computer 50 may be an example of a first computer, the hub computer can be an example of a second computer, and the processing network computer 40 may be an example of a third computer, and the transport computer 30 may be an example of a fourth computer. Further, more specific descriptions of some of the steps described in FIG. 3 can be found in the description above with respect to FIG. 1, and those descriptions are incorporated herein.

In embodiments of the invention, a first computer can establish a first interaction channel 72 with a second computer (step S310). The first interaction channel 72 can be established by recording a first initial value associated with the first computer and a second initial value associated with the second computer on a blockchain (step S314). For example, the first interaction channel 72 may be a first off-chain interaction channel 72 that may have be opened by the hub computer 60 and the authorizing entity computer 50.

The first off-chain interaction channel 72 may have been formed by at least a first initial recordation between the hub computer 60 and the authorizing entity computer 50 on the blockchain on the blockchain network 70 (e.g., a funding transaction). Off chain interactions between the authorizing entity computer 50 and the hub computer 60 can occur while the first off-chain channel 72 is open (step S326). Further, the first off-chain interaction channel 72 may later be closed by a first closing recordation between the hub computer 60 and the authorizing entity computer 50 on the blockchain on the blockchain network 70 (e.g., a commitment transaction) (step S326).

Likewise, a second interaction channel such as a second off-chain interaction channel may have been previously opened by the hub computer 60 and the transport computer 30 (step S312). The second off-chain interaction channel may have been formed at least by a second initial recordation between the hub computer 60 and the transport computer 30 on the blockchain on the blockchain network 70 (e.g., a funding transaction) (step S316). Off chain interactions between the transport computer 30 and the hub computer 60 can occur while the second off-chain channel 72 is open (step S324). Further, the second off-chain interaction channel may later be closed by a second closing recordation between the hub computer 60 and the transport computer 30 on the blockchain of the blockchain network 70 (e.g., a commitment transaction) (steps S328, S332).

In the above example, the terms "first" and "second," are intended only to distinguish the off-chain interaction channels, their corresponding initial recordations and corresponding closing recordations, not to indicate, for example, the order in which the channels were opened or closed.

Each opening and closing of the channel requires a recordation on the blockchain of the blockchain network 80 takes time. In some cases, each recordation to the blockchain of the blockchain network 80 can take 10 minutes or longer.

As noted above after the first off-chain interaction channel 72 between the hub computer 60 and the authorizing entity computer 50 has been opened, but before the first off-chain interaction channel 72 is closed, the hub computer 60 and the authorizing entity computer 50 can conduct a plurality of interactions without recording the interactions on the blockchain on the blockchain network 70.

After conducting the plurality of transactions, the authorizing entity computer 50 can determine a first current value associated with the authorizing entity computer 50, the first current value being less than the first initial value. As an illustration, the authorizing entity computer 50 and the hub computer 60 may have each deposited an initial value of 100 BTC to the blockchain in the blockchain network 70. The authorizing entity computer 50 and the hub computer may then have conducted a number of off-chain transactions. For example, the authorizing entity computer 50 may have conducted five transactions, each paying the hub computer 60, twenty BTC for each transaction. At this point, authorizing entity computer 50, may have a first current value of zero BTC, while the hub computer 60 would have 200 BTC for use in the first off-chain interaction channel.

At this point, the authorizing entity computer 50 may be unable to perform additional payment transactions to the hub computer 60 on the first off-chain channel. As such, in prior systems and methods, one option for the authorizing entity computer 50 would be to close the first off-chain interaction channel, and open a new off-chain interaction channel by providing a new deposit to the blockchain on the blockchain network 70. However, as will be described in further detail below, embodiments of the invention can allow the first off-chain interaction channel to remain open and can allow the authorizing entity computer 50 to make further payments to the hub computer 60 in the off-chain interaction channel.

In step S330, the authorizing entity computer 50 may initiate a transfer of transfer value to the processing network computer 40 via a communication channel different than the first off-chain interaction channel described above. The processing network computer 40 may be in communication with the hub computer 60.

As an illustration, the authorizing entity computer 50 may transfer fiat currency to the processing network computer 40. The amount of fiat currency transferred may be associated with the amount that the authorizing entity computer 50 wants to use in the first off-chain interaction channel. For example, the authorizing entity computer 50 may wish to have 100 BTC in the first off-chain interaction channel again. The authorizing entity computer 50 may then transfer an amount of fiat currency equivalent to 100 BTC to the processing network computer 40. For instance, if each BTC is worth 100 USD (US dollars), then 100,000 USD may be transferred from the authorizing entity computer 50 to the processing network computer 40.

In other embodiments, the amount of fiat currency associated with the amount of cryptocurrency desired by the authorizing entity computer 40 for the first off-chain interaction channel may be included with an aggregated settlement amount. The aggregated settlement amount may be an amount that the authorization entity computer 50 would pay to the processing network computer 40 for settlement of amounts associated with fiat currency transactions conducted by the users associated with accounts (credit, debit, and/or prepaid accounts) held by the authorizing entity computer 50. For example, the authorizing entity computer 50 may hold accounts for a number of credit and debit card users. Those users may have conducted transactions totaling one million USD. The one million USD may then to transferred to the processing network computer 40, which may later be distributed to various transport computers which hold accounts of resource providers (e.g., merchants) that conducted transactions with the users of the accounts at the authorizing entity computer 50. However, in embodiments of the invention, instead of transferring one million USD to the processing network computer 40, the authorizing entity computer 50 may transfer 1,100,000 USD to the processing network computer 40. One million USD of this amount would be to settle fiat currency transactions, and 100,000 USD of the amount would be to replenish the first off-chain channel for the authorizing entity computer 50. Prior to the transfer of settlement funds, the authorizing entity computer 50 may have transmitted one or more messages with information as to how the settlement funds are to be allocated by the processing network computer 40, or such information could be present with the transfer of funds.

Once the funds have been transferred from the authorizing entity computer 50 to the processing network computer 40, in step S333, the processing network computer 40 may send a message to the hub computer 60 to transfer the appropriate amount of cryptocurrency to the authorizing entity computer 50 via the first off-chain interaction channel. In step S334, the processing network computer 40 may also send any aggregated settlement amounts from the authorizing entity computer 50 and other authorizing entity computers associated with any fiat currency transactions to the transport computer 30. The transport computer 30 and other transport computers may eventually credit the accounts of the resource providers associated with them.

After this occurs, the authorizing entity computer 50 and the hub computer 60 may perform an update interaction to update of the first current value by the transfer value to obtain a second current value, where the second current value used by the authorizing entity computer 50 in the first off-chain interaction channel. As an illustration of an update interaction, the hub computer 60 can transmit a first off-chain interaction request comprising the transfer value to the authorizing entity computer 50. In the above example, the transfer value could be 100 BTC. The off-chain interaction request can also include identifiers for the hub computer 60 and the authorizing entity computer 50. The interaction request may also be signed by a private key of the hub computer 60. The authorizing entity computer 50 can receive the interaction request. It may review it, and if it is accurate, then the authorizing entity computer 50 can sign interaction data in the interaction request indicating acceptance of the transfer value. The authorization entity computer 50 could then transmit an interaction response message with the signed interaction data back to the hub computer 60.

At this point, the authorizing entity computer 50 would have a second current value that was updated by the transfer value. Continuing with the above illustration, if the first current value was zero BTC, and the transfer value was 100 BTC, then the second current value would be 100 BTC. The authorizing entity computer 50 can now advantageously continue to conduct off-chain interactions with the hub computer 60, without closing the first off-chain channel.

Figure 4:
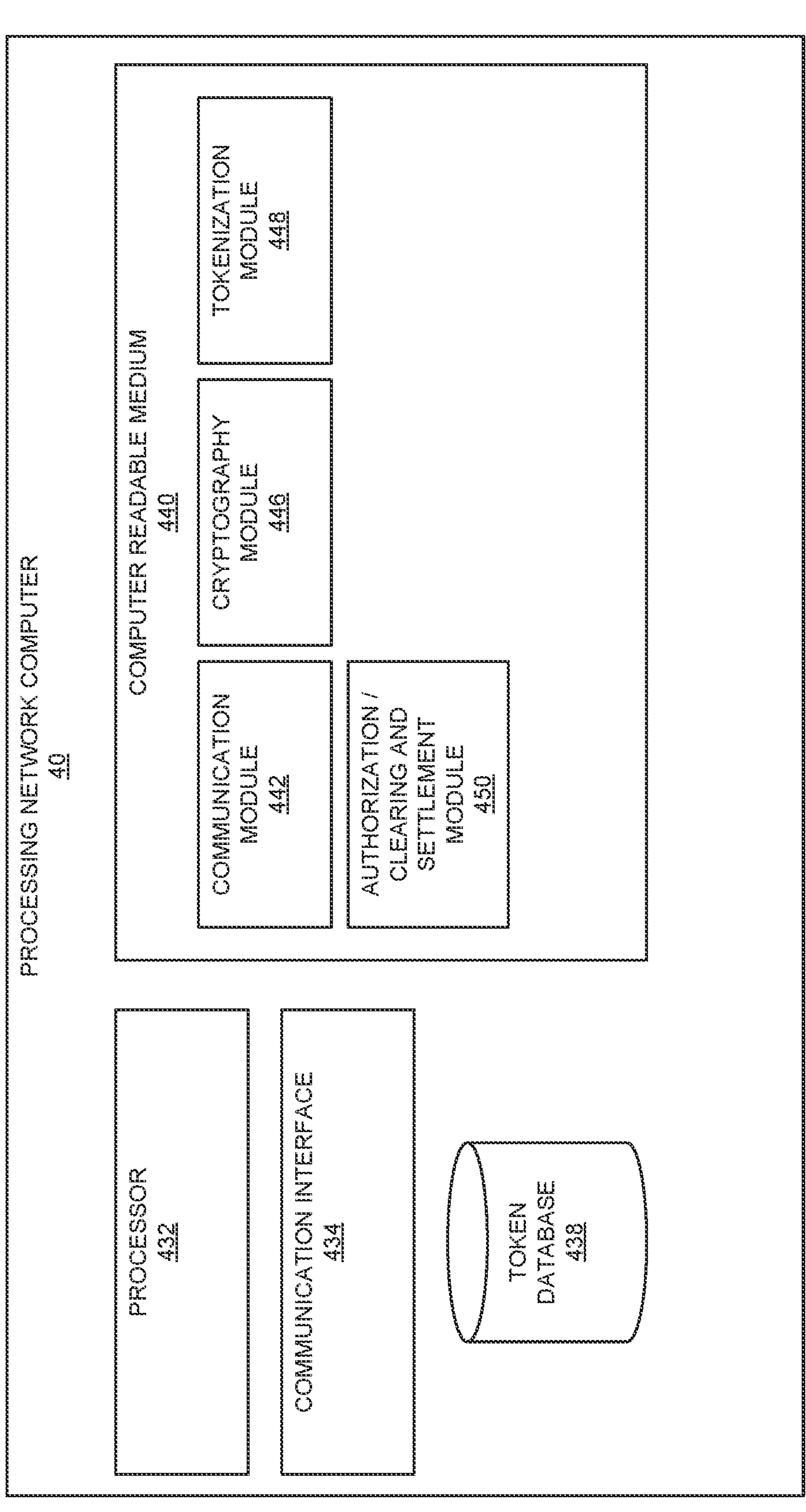
FIG. 4 shows a block diagram of a processing network computer according to an embodiment of the invention.

FIG. 4 shows a block diagram of a processing network computer 40 according to an embodiment of the invention. The processing network computer 40 comprises a processor 432, a communications interface 434, a token database 438, and a non-transitory computer readable medium 440, comprising or storing a number of software modules, including a communication module 442, a cryptography module 446, a tokenization module 448, and a licensing module 450.

The token database 438 may comprise a database of information used to map access tokens to digital wallet tokens. The processing network computer 40 may receive cryptograms encoding digital wallet tokens and other information, and the processing network computer 40 can use token database 408 to identify the corresponding access token (e.g., a virtual PAN). The access token may then be transmitted to the hub computer which identifies the authorizing entity computer, and the off-chain channel corresponding to the authorizing entity computer.

Communication module 442 may comprise code, software, or instructions the may be interpreted and executed by processor 402. This software may be used by hub computer 60 in order to communicate with other computers, devices, and entities in the off-chain interaction authorization system, such as the computers, devices, and entities displayed in FIG. 1. Communication module 442 may enable processing network computer 40 to communicate with other computers and devices according to any appropriate communication protocol, such as the user datagram protocol (UDP), the transmission control protocol (TCP), ISO 8583, etc.

Cryptography module 446 may comprise code or software, executable by processor 402 for performing cryptographic services, including encrypting or decrypting data (such as decrypting received cryptograms, or generating authorization response cryptograms), digitally signing data, generating cryptographic keys (such as limited use keys), performing key exchanges, encrypting messages sent to other systems or devices, and the like.

Tokenization module 448 may comprise code or software, executable by processor 432, for implementing tokenization services. These services can include generating and provisioning digital wallet tokens to mobile devices. These services can also include associating digital wallet tokens to access tokens, and "de-tokenizing" digital wallet tokens to identify the corresponding access token. The tokenization module 440 and the processor 432 may also detokenize an access token to obtain a real credential corresponding to that access token. The tokenization module 418 may also be used by the processing network computer 106 to access, search, and modify token database 408.

Authorization/clearing and settlement module 450 may comprise code or software, executable by processor 432 for performing authorization, and clearing and settlement processing. Such processing may include message routing, as well as aggregating and distributing funds.

Figure 5:
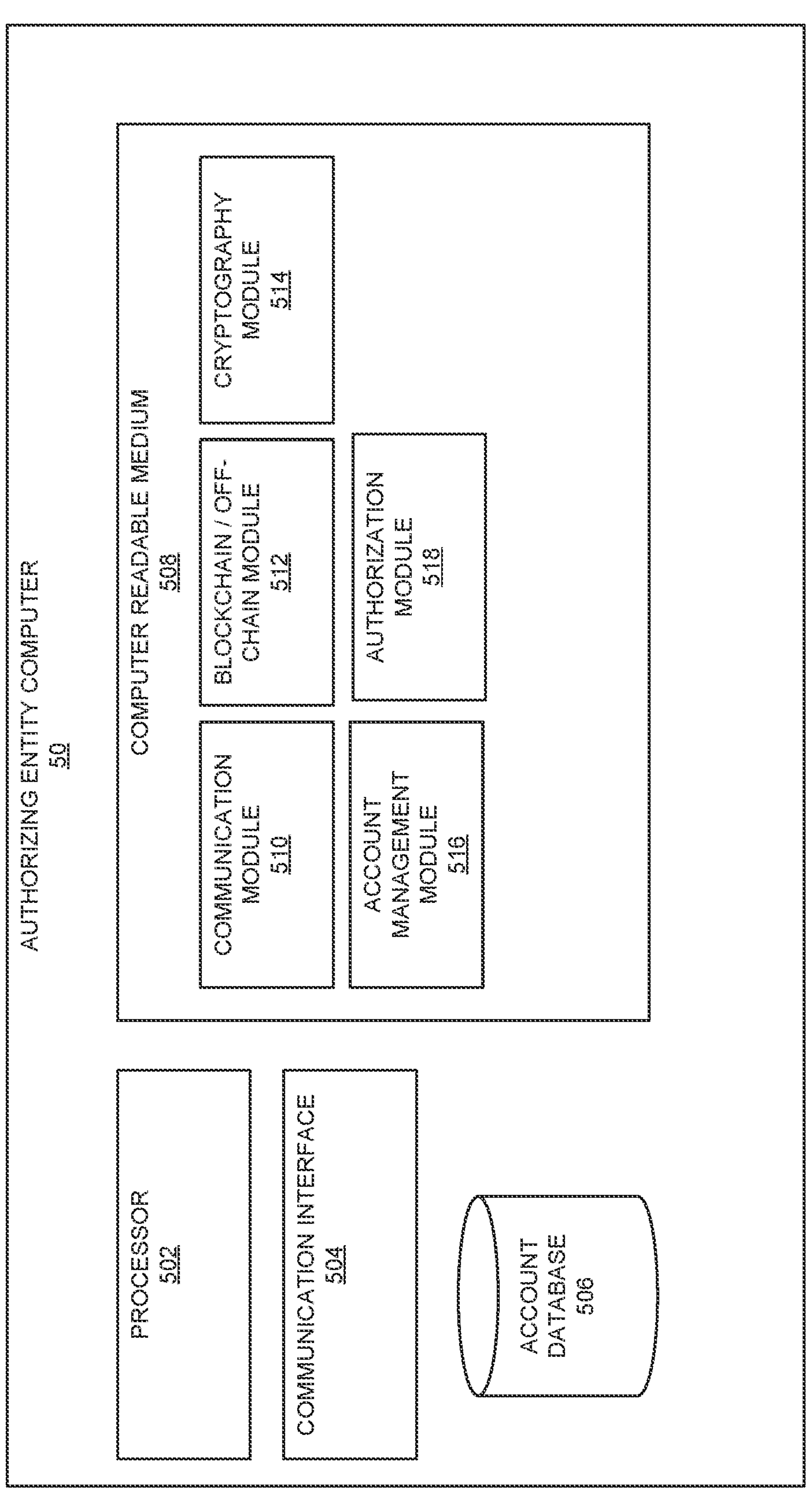
FIG. 5 shows a block diagram of an authorizing entity computer according to an embodiment of the invention.

FIG. 5 shows a block diagram of an authorizing entity computer 50 according to an embodiment of the invention. It includes a processor 502, a communication interface 504, an account database 506, and a computer readable medium 508. The computer readable medium 508 may comprise or store a number of software modules, including a communication module 510, a blockchain/off-chain module 512, a cryptography module 514, and an account management module 516.

Processor 502 may comprise any suitable data computation device or devices. Processor 502 may be able to interpret code and carry out instructions stored on computer readable medium 508. Processor 502 may comprise a Central Processing Unit (CPU) operating on a reduced instructional set, and may comprise a single or multi-core processor. Processor 502 may also include an Arithmetic Logic Unit (ALU) and a cache memory.

Communication interface 504 may comprise any interface by which authorizing entity computer 50 may communicate with other computers or devices. Examples of communication interfaces include: wired interfaces, such as USB, Ethernet, or FireWire, as well as wireless interfaces such as a Bluetooth or Wi-Fi receivers. Authorizing entity computer 50 may possess multiple communication interfaces 504. As an example, authorizing entity computer 50 may possess and communicate via Ethernet and USB interfaces.

Authorizing entity computer 50 may communicate with other devices or computers using communication interface 504 via one or more secure and authenticated point-to-point channels. These channels may use a standard public key infrastructure. For example, authorizing entity computer 50 and a hub computer may exchange a symmetric key via their communication interfaces. This key exchange may comprise, for example, a Diffie-Hellman key exchange. After exchanging cryptographic keys, authorizing entity computer 50 and the hub computer may communicate over a public channel (such as an unsecured network) using a standard authenticated encryption scheme. Messages between authorizing entity computer 50 and the hub computer can be encrypted with the symmetric cryptographic key. Additional authentication methods, such as digital signatures, can also be used.

Account database 506 may comprise a database of user accounts and user account information. These may comprise cryptocurrency accounts corresponding to users' cryptocurrency and/or fiat currency holdings. The database may also store associated "account values" corresponding to the amounts and types of cryptocurrencies held by those users, such as "2 BTC." Account database 506 may additionally comprise key-value pairs that relate access tokens and mobile devices (or mobile device identifiers) to their corresponding accounts. The authorizing entity computer 50 may use account database 506 to debit cryptocurrency from user accounts during cryptocurrency based interactions. In some embodiments, in addition to managing a cryptocurrency account for a user, the authorizing entity computer 50 may also manage a fiat currency account. For example, a bank computer could manage both cryptocurrency and fiat currency accounts for a user.

Communication module 510 may comprise code, software, or instructions the may be interpreted and executed by processor 502. This software may be used by authorizing entity computer 50 in order to communicate with other computers, devices, and entities in the off-chain interaction authorization system, such as the devices and computers shown in FIG. 1. This may include code or instructions for: receiving off-chain interaction requests from a hub computer, receiving access tokens and interaction values from the hub computer, generating and transmitting off-chain interaction responses to the hub computer, as well as communicating with a mobile device via a mobile wallet application, including transmitting authorization response messages and cryptocurrency account information. Communication module 510 may enable authorizing entity computer 50 to communicate with other computers and devices according to any appropriate communication protocol, such as the user datagram protocol (UDP), the transmission control protocol (TCP), ISO 8583, etc.

Blockchain/Off-chain module 512 may comprise code, software or instructions that may be interpreted and executed by processor 502 in order to manage off-chain channels and interface with their underlying blockchains. For example, the authorizing entity computer 50 may use blockchain/off-chain module 512 to open an off-chain channel with a hub computer by broadcasting an initial recordation to the underlying blockchain. Authorizing entity computer 50 may also use blockchain/off-chain module 512 to generate commitment transactions that reflect an updated state of the corresponding off-chain channel. Additionally, authorizing entity computer 50 may use blockchain/off-chain module 414 to broadcast a closing recordation to the underlying blockchain. Further, authorizing entity computer 50 may use blockchain/off-chain module 512 to interpret off-chain interaction request messages and generate off-chain interaction response messages, in order to update the state of the off-chain channel.

Cryptography module 514 may comprise code or software, executable by processor 502 for performing cryptographic services, including encrypting or decrypting data, and signing data, including signing commitment transactions, signing interaction data to generate off-chain interaction responses, etc. Cryptography module 514 may also be used by authorizing entity computer 50 to perform key exchanges.

Account management module 516 may comprise code or software, executable by processor 502 for managing user accounts and interfacing with account database 506. The authorizing entity computer 50 may use account management module 516 to debit a user's account based on an interaction value received in an off-chain interaction request, e.g., by subtracting the interaction value from a corresponding account value.

Authorization module 518 can comprise code executable by the processor 502 to perform authorization processing of transaction messages.

Figure 6:
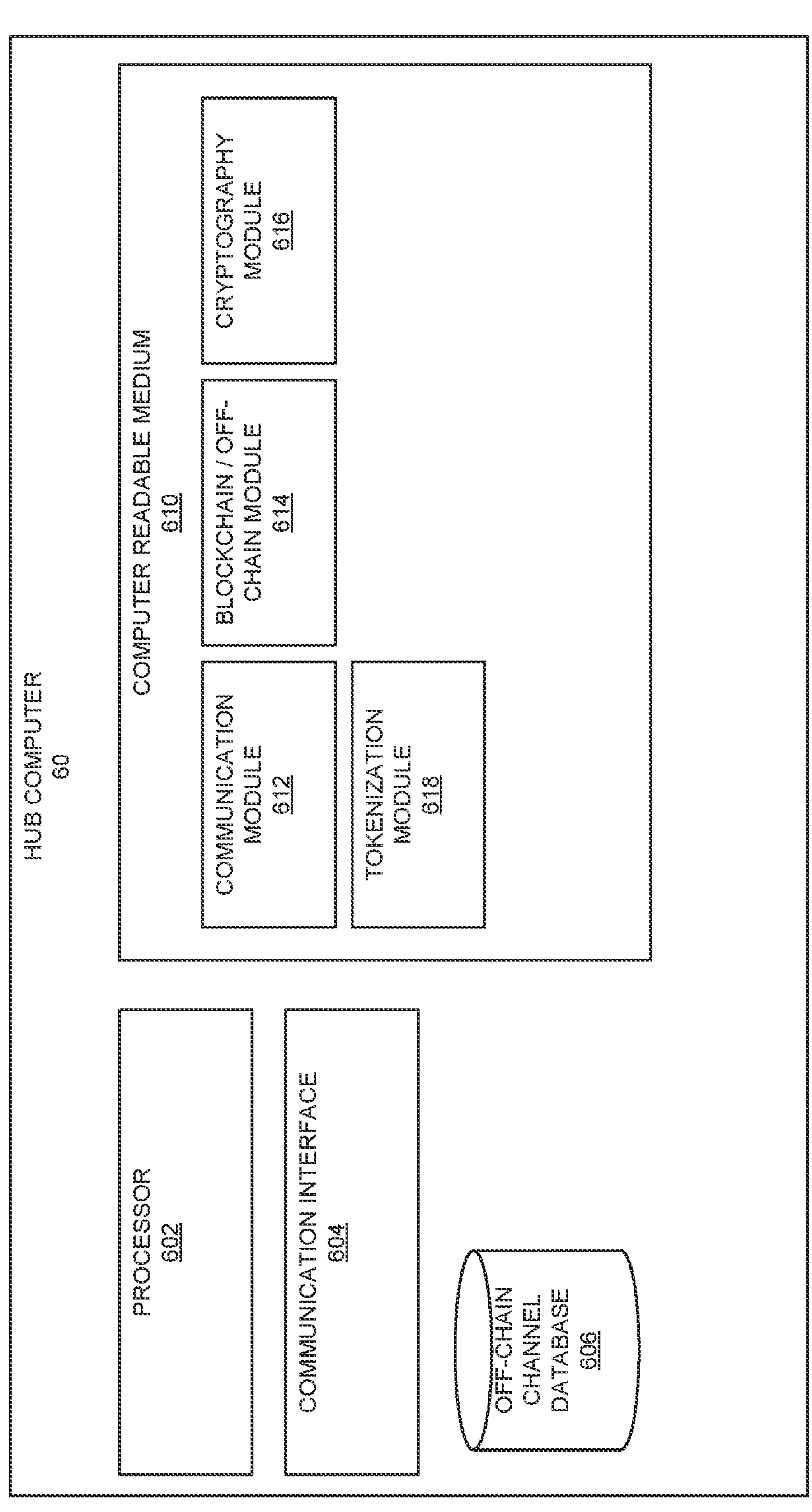
FIG. 6 shows a block diagram of a system diagram and a process flow according to an embodiment of the invention.

FIG. 6 shows a block diagram of a hub computer according to an embodiment of the invention. It includes a processor 602, a communications interface 604, an off-chain channel database 606, and a computer readable medium 610, comprising or storing a number of software modules, including a communication module 612, a blockchain/off-chain module 614, and a cryptography module 616.

Processor 602 may comprise any suitable data computation device or devices. Processor 602 may be able to interpret code and carry out instructions stored on computer readable medium 610, and may be similar to the previously described processors.

Communication interface 604 may comprise any interface by which hub computer 60 may communicate with other computers or devices, and may be similar to the previously described communication interfaces.

The off-chain channel database 606 may comprise a database of information used to identify off-chain channels. This may include, for example, key-value pairs associating access tokens with off-chain channel identifiers or cryptocurrency issuer addresses. It may also include, for example, key-value pairs associating resource provider identifiers with off-chain channel identifiers or cryptocurrency custodian addresses. The hub computer 60 may access this information in order to identify the cryptocurrency issuer associated with an access token received from an access device, in order to subsequently request interaction authorization from the authorizing entity computer.

Communication module 612 may comprise code, software, or instructions the may be interpreted and executed by processor 602. This software may be used by hub computer 60 in order to communicate with other computers, devices, and entities in the off-chain interaction authorization system, such as the computers, devices, and entities displayed in FIG. 1.

Blockchain/Off-chain module 614 may comprise code or software, executable by processor 602 to enable the hub computer 60 to perform functions associated with managing an off-chain channel or the underlying blockchain corresponding to that channel. For example, the hub computer 60 may use blockchain/off-chain module 614 to open an off-chain channel with a authorizing entity computer or a cryptocurrency custodian computer by broadcasting an initial recordation (otherwise referred to as an initial transaction or a funding transaction) to the underlying blockchain. Hub computer 60 may also use blockchain/off-chain module 614 to generate commitment transactions that reflect an updated state of the corresponding off-chain channel. Additionally, hub computer 60 may use blockchain/off-chain module 614 to broadcast a closing recordation (otherwise referred to as a closing transaction or commitment transaction) to the underlying blockchain. Further, blockchain/off-chain module 614 may be used by hub computer 60 to access, search, and modify the off-chain channel database 606.

Cryptography module 616 may comprise code or software, executable by processor 602 for performing cryptographic services, including encrypting or decrypting data (such as generating authorization response cryptograms), digitally signing data (such as commitment transactions), performing key exchanges, encrypting messages sent to other systems or devices, and the like.

Embodiments of the invention have a number of advantages. As noted above, using embodiments of the invention, an off-chain interaction channel need not be closed if one of the parties that formed the off-chain channel does not have sufficient funds to continue transacting on the off-chain channel. As noted above, in some instances, a transaction on a blockchain network could take on the order of 10 minutes to conclude. Thus, performing many opening and closing transactions on a blockchain is not desirable. Embodiments of the invention allow off-chain interaction channels to function in a continuous manner without the continuous open and closing of interaction channels. As noted above, in some embodiments, funds that can be used to replenish amounts for the first off-chain interaction channel can be transmitted along with fiat currency settlement amounts for fiat current transactions. As such, additional communication or transaction channels need not be set up between the authorizing entity computer 50, and the hub computer 60 and/or the processing network computer.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

establishing, by a first computer with a second computer, a first interaction channel with a first initial value associated with the first computer and a second initial value associated with the second computer, the first and second initial values recorded on a blockchain, and the first interaction channel is a first off-chain interaction channel;

conducting by the first computer with the second computer, a plurality of interactions without recording the interactions on the blockchain;

after conducting the plurality of interactions, determining, by the first computer, a first current value associated with the first computer, the first current value being less than the first initial value;

initiating, by the first computer, a transfer of a transfer value in fiat currency from the first computer to a third computer in communication with the second computer via a communication channel different than the first interaction channel, wherein responsive to the transfer of the transfer value to the third computer, the third computer transmits a message to the second computer to transfer an update value in cryptocurrency equivalent to the transfer value to the first computer;

after initiating the transfer, conducting, by the first computer with the second computer, an update interaction via the first interaction channel while the first interaction channel remains open to update of the first current value by the update value to obtain a second current value, the second current value used by the first computer in the first interaction channel, wherein the update interaction includes the second computer transmitting an off-chain interaction request including identifiers for the first computer and the second computer, and the update value, and a digital signature of the second computer on the off-chain interaction request, and the first computer transmitting an interaction response message comprising a digital signature of the first computer on the off-chain interaction request; and closing, by the first computer with the second computer, the first interaction channel with a first final value associated with the first computer and a second final value associated with the second computer, the first final value and the second final value being recorded on the blockchain.

2. The method of claim 1, wherein the communication channel is a settlement transaction channel.

3. The method of claim 1, wherein the first computer is an authorizing entity computer, the second computer is a hub computer, and the third computer is a processing network computer.

4. The method of claim 1, wherein the digital signature of the off-chain interaction request includes, the off-chain interaction request signed by a private key of the second computer.

5. The method of claim 1, wherein the second computer forms a second interaction channel with a fourth computer with a third initial value associated with the second computer and a fourth initial value associated with the fourth computer, wherein the third initial value and the fourth initial value are recorded on the blockchain.

6. The method of claim 5, wherein the second computer conducts with the fourth computer, another plurality of interactions without recording the interactions on the blockchain.

7. The method of claim 6, wherein the fourth computer is a transport computer.

8. A first computer comprising:

a processor; and a non-transitory computer readable medium, comprising instructions, executable by the processor, for causing the first computer to:

establish, with a second computer, a first interaction channel with a first initial value associated with the first computer and a second initial value associated with the second computer, the first and second initial values recorded on a blockchain, and the first interaction channel is a first off-chain interaction channel;

conduct, with the second computer, a plurality of interactions without recording the interactions on the blockchain;

determine a first current value associated with the first computer, the first current value being less than the first initial value;

initiate a transfer of a transfer value in fiat currency from the first computer to a third computer in communication with the second computer via a communication channel different than the first interaction channel, wherein responsive to the transfer of the transfer value to the third computer, the third computer transmits a message to the second computer to transfer an update value in cryptocurrency equivalent to the transfer value to the first computer; and after initiating the transfer, conduct, with the second computer, an update interaction via the first interaction channel while the first interaction channel remains open to update of the first current value by the update value to obtain a second current value, the second current value used in the first interaction channel, wherein the update interaction includes the second computer transmitting an off-chain interaction request including identifiers for the first computer and the second computer, and the update value, and a digital signature of the second computer on the off-chain interaction request, and transmitting an interaction response message comprising a digital signature of the first computer on the off-chain interaction request; and closing, by the first computer with the second computer, the first interaction channel with a first final value associated with the first computer and a second final value associated with the second computer, the first final value and the second final value being recorded on the blockchain.

9. The first computer of claim 8, wherein the first computer is an authorizing entity computer.

10. The first computer of claim 8, wherein the computer readable medium comprises an authorization module comprising code for approving of different types of interactions.

11. A method comprising:

establishing, by a second computer with a first computer, a first interaction channel with a first initial value associated with the first computer and a second initial value associated with the second computer, the first and second initial values recorded on a blockchain, and the first interaction channel is a first off-chain interaction channel;

conducting, by the second computer with the first computer, a plurality of interactions without recording the interactions on the blockchain, wherein after conducting the plurality of interactions, the first computer determines a first current value associated with the first computer, the first current value being less than the first initial value, and initiating, by the first computer, a transfer of a transfer value in fiat currency from the first computer to a third computer in communication with the second computer via a communication channel different than the first interaction channel, wherein responsive to the transfer of the transfer value to the third computer, the third computer transmits a message to the second computer to transfer an update value in cryptocurrency equivalent to the transfer value to the first computer;

receiving, by the second computer, the message from the third computer;

conducting, by the second computer, an update interaction via the first interaction channel while the first interaction channel remains open to update of the first current value by the transfer value to obtain a second current value, the second current value used by the first computer in the first interaction channel, wherein the update interaction includes the second computer transmitting an off-chain interaction request including identifiers for the first computer and the second computer, and the update value, and a digital signature of the second computer on the off-chain interaction request, and the first computer transmitting an interaction response message comprising a digital signature of the first computer on the off-chain interaction request; and closing, by the first computer with the second computer, the first interaction channel with a first final value associated with the first computer and a second final value associated with the second computer, the first final value and the second final value being recorded on the blockchain.

12. The method of claim 11, wherein the first computer is an authorizing entity computer, the second computer is a hub computer, and the third computer is a processing network computer.

13. The method of claim 11, wherein the digital signature of the off-chain interaction request includes the off-chain interaction request signed by a private key of the second computer.

14. The method of claim 11, further comprising:

forming a second interaction channel with a fourth computer with a third initial value associated with the second computer and a fourth initial value associated with the fourth computer, wherein the third initial value and the fourth initial value are recorded on the blockchain.

15. The method of claim 14, further comprising:

conducting another plurality of interactions with the fourth computer without recording the interactions on the blockchain.

16. The method of claim 15, further comprising:

closing, by the second computer with the fourth computer, the second interaction channel with a third final value associated with the second computer and a fourth final value associated with the fourth computer, the third final value and the fourth final value being recorded on the blockchain.

17. The method of claim 14, wherein no interaction between the second computer and the fourth computer in a fourth interaction channel corresponds to the transfer value.

18. The method of claim 14, wherein the transfer of the transfer value from the first computer to the third computer is part of a settlement for a plurality of values.

19. The method of claim 18, wherein the plurality of values comprise values associated with authorization request messages sent by resource provider computers.

20. The method of claim 18, wherein the first initial value is a first initial cryptocurrency value, and the second initial value is a second initial cryptocurrency value.

* * * * *